United States Patent [19]

Collingwood

[11] Patent Number: 4,894,858
[45] Date of Patent: Jan. 16, 1990

[54] PORTABLE THROUGH-DOOR INTERCOM

[76] Inventor: Michael R. Collingwood, 10260 Warner Ave. #B, Fountain Valley, Calif. 92708

[21] Appl. No.: 358,151

[22] Filed: May 26, 1989

[51] Int. Cl.$^4$ .................. H04M 1/04; H04M 9/04
[52] U.S. Cl. .................. 379/167; 379/110; 379/435; 379/454
[58] Field of Search ............ 379/167, 110, 170, 176, 379/174, 420, 428, 434, 435, 440, 454, 457; 381/87

[56] References Cited

U.S. PATENT DOCUMENTS

| | | | |
|---|---|---|---|
| 4,130,728 | 12/1978 | Grauel | 179/1 H |
| 4,584,436 | 4/1986 | Boenning et al. | 179/37 |
| 4,631,365 | 12/1986 | Potter et al. | 379/167 |
| 4,809,320 | 2/1989 | Hawkins et al. | 379/167 |

Primary Examiner—Stafford D. Schreyer
Attorney, Agent, or Firm—Richard L. Gausewitz

[57] ABSTRACT

A through-door security intercom that clamps on the free edge of a door of any conventional thickness. Clamping is effected by constant-force flat springs, which springs also provide current paths. The springs are pre-bent at acute angles at predetermined points, to aid in mounting of the outside unit on the door. The inside unit is mounted on the door due to the force created by the constant-force springs which are coiled on spools. Brushes in the inside unit engage the springs and complete the electric circuit.

21 Claims, 1 Drawing Sheet

U.S. Patent
Jan. 16, 1990
4,894,858
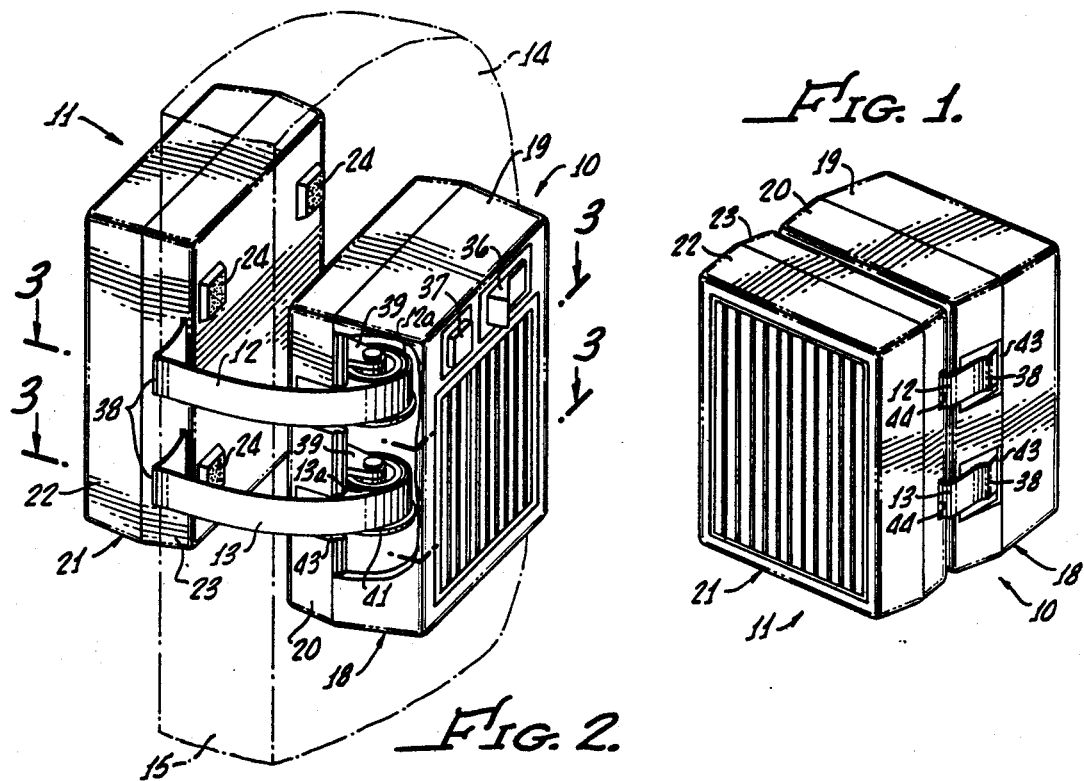
FIG. 1.
FIG. 2.
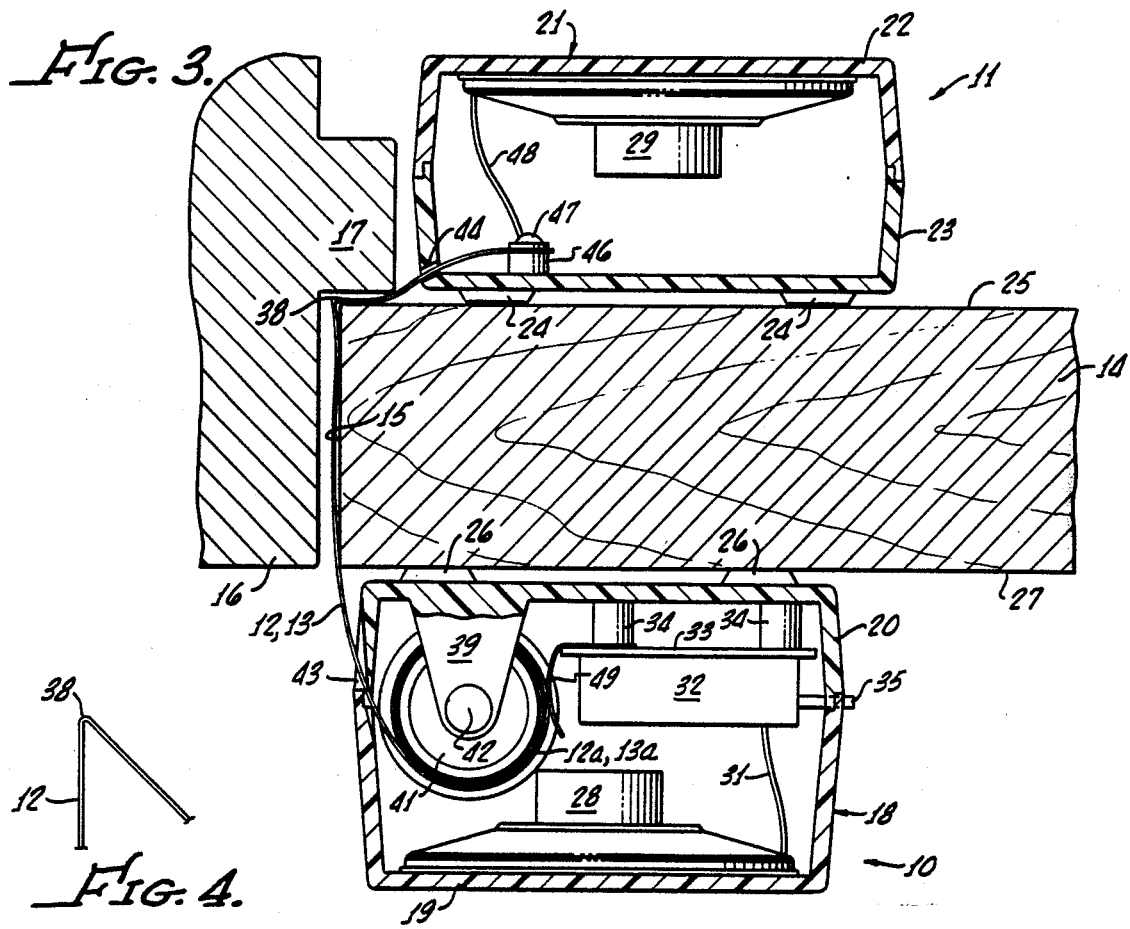
FIG. 3.
FIG. 4.

PORTABLE THROUGH-DOOR INTERCOM

BACKGROUND OF THE INVENTION

It has long been recognized that shouting through closed doors is an unsatisfactory way for persons in apartments, hotel rooms, vacation condominiums, etc., to communicate with attempted visitors in order to be sure that the attempted visitors are not impostors or criminals. The door muffles the sound, and makes it difficult for the apartment dwellers to recognize voices with accuracy.

Many apartment (for example) doors do not have peep holes, and it is not authorized for holes to be drilled in the doors. The same applies to hotel room doors, where the danger of unwanted intruders is perhaps even greater than relative to apartments.

It has been proposed several times to mount outside and inside intercom units on the doors of dwellings, using the peep holes for the mounting and connecting means. Such proposals are of no value to persons who wish to speak through doors of apartments, hotel rooms, condominiums, etc., where there are no peep holes. Furthermore, and very importantly, such apparatus is not readily portable, nor is it quickly mountable and demountable.

SUMMARY OF THE INVENTION

The present invention provides compact, portable intercom units that do not require the peep hole, and that are quickly and easily mounted on and removed from any door.

In accordance with one aspect of the present invention, outside and inside intercom units are mounted at the edge of a door, and are electrically and mechanically connected to each other by elements going around the edge of the door.

In accordance with another aspect of the present invention, the elements that go around the edge of the door are the same elements that effect mounting of the outside and inside intercom units to the door, such mounting elements being adjustable for mounting of the intercom units to the surfaces of doors of different thicknesses.

In accordance with another aspect of the present invention, the same elements that mount the intercom units to the outside and inside of the door provide electrical connection between such units.

In accordance with another aspect of the present invention, resilient means are provided to hold the outside and inside intercom units in full engagement with the door surfaces.

In the preferred embodiment of the present invention, constant-force springs are coiled on spools in one of the intercom units, and extend outwardly from the housing of such unit, and are connected to the other intercom unit, the constant-force springs being adapted to cause the outside and inside intercom units to engage the door surfaces.

Stated more specifically, and again referring to the preferred embodiment, the constant-force springs conduct electricity between the intercoms. Furthermore, the coiled portions of such springs generate torque which causes one of the intercoms to be parallel to the associated door surface instead of inclined relative thereto. The spring portions remote from the coiled portions are pre-bent at acute angles, the relationships being such that the other of the intercom units is held in parallel relationship to the associated door surface by the spring force resulting from such pre-bending. Furthermore, the pre-bent corners provide sharp breaks causing the spring portions to substantially hug the door edge.

It is a feature of the invention that the constant-force springs are substantially impervious to being damaged due to being pinched between the door edge and the door jamb.

BRIEF DESCRIPTION OF THE DRAWINGS

FIG. 1 is an isometric view showing the outside and inside intercom units in condition for carrying and storing, the units being held by the spring elements in substantially parallel engagement with each other;

FIG. 2 is an isometric view showing the intercom units in position on the free edge of a door, the door being shown in phantom line, portions being broken away;

FIG. 3 is a horizontal sectional view taken on either of lines 3—3 of FIG. 2; and FIG. 4 is a fragmentary view of one of the springs at the corner thereof, showing the free condition of each spring at its corner.

DETAILED DESCRIPTION OF THE PREFERRED EMBODIMENT

Referring first to FIG. 2, and also to FIGS. 1 and 3, there is shown an electrical intercom comprising an inside unit 10 and an outside unit 11 that are connected to each other by elements 12,13 that go around the edge of the door 14. Door 14 is a conventional door of any thickness, being pivoted on suitable hinges (not shown) at the door edge remote from the illustrated door edge 15. Such hinges are contained in a conventional rectangular door frame or jamb 16 having the usual stop element 17 for the door edge 15.

The door frame and door are those which are part of (and permit or prevent entrance into and exit from) apartments, vacation (or other) condominiums, hotel rooms, mobile homes, motorhomes, houses, etc.

The inside and outside electrical intercom units 10,11 are shown, in the present drawings, as being mounted on the free left vertical edge (as viewed from the inside of the dwelling space) 15 of door 14. For doors that pivot the other way, by which it is meant that the hinges are on the left side as viewed from the inside of the dwelling space, and the free edge is on the right, it is merely necessary to invert both the inside and outside units 10,11 and mount them at the right edge of the door.

Inside unit 10 has a rectangular housing 18 formed of two mated portions or sections 19,20 that are secured together by screws, not shown. The housing portions or sections 19,20 are injection molded of synthetic resin.

Similarly, outside unit 11 has an injection-molded synthetic-resin rectangular housing 21 formed of mated portions or sections 22,23 held together by unshown screws. The housing 21 of the outside unit is substantially smaller than is that of the inside unit. The outside unit preferably contains no electronics or moving parts, and represents only a small fraction of the manufacturing cost of the through-door intercom system.

Preferably, the housing 21 of outside unit 11 has four feet or pads 24 at corner regions thereof, and adapted to seat on the outside surface 25 of door 14. Correspondingly, there are provided at corner regions of inside housing 18 four feet or pads 26 that rest on the inside door surface 27. Pads 24 and 26 are formed of a soft material, such as rubber or synthetic elastomer, adapted to increase friction relative to the door surfaces and also prevent any possible damage to the finish thereon.

Combination speakers/microphones 28,29 are mounted in housings 18,21, respectively, in outwardly-facing relationship relative to door 14. The speakers/microphones are secured to the outer walls of housings 18,21, respectively, at slotted portions of such walls. In the case of outside unit 11, speaker/microphone 29 is preferably the only electrical element other than leads or wires. On the other hand, inside speaker/microphone 28 is connected by leads or wires 31 to electronic circuitry which is schematically represented at 32. Circuitry 32 is mounted on a circuit board 33 that, in turn, is secured by posts 34 to the bottom wall of portion 20 of inside housing 18.

The circuitry 32 preferably comprises a differential amplifier that is powered by a battery (not shown). The power is controlled by a volume-control wheel 35. A switch 36 is mounted above the speaker/microphone of inside unit 10 in order to determine when power is supplied to the differential amplifier and associated circuitry from the battery. Preferably, such switch is of the internally-lighted variety so that the user will know when the switch is on. A push-button switch 37 (double-pole double throw) is mounted adjacent switch 36 and is pushed by the householder when it is desired that any person speak into the intercom system, whether from the outside or inside of the door. Switch 37 insures that there will be no eavesdropping on the occupants by a person located outside the door.

The electronics portions of the present invention are standard and well known, it being understood, however, that the leads that go from one unit to another constitute a major portion of one aspect of the invention. Electronic circuitry which may be employed includes, for example, that described in U.S. Pat. 4,809,320. The electronics portions of the disclosure of such patent are hereby incorporated by reference herein.

Preferred Embodiment of the Elements for Causing Units 10,11 to Remain in Place Against Door 14, and for Electrically and Mechanically Connecting Such Units to Each Other In accordance with a major aspect of the preferred embodiment, spring means are provided to generate torque so directed as to hold one of the units 10,11 flatwise against the door surface. Means are also provided to create a flexural spring force, also a torque, aiding in maintaining the other of the units 10,11 against the opposite door surface. In addition, means are provided to effect electrical connections between the units 10,11 around the door edge 15.

In the preferred embodiment, all of the above-mentioned means are incorporated in the same elements 12,13, and associated parts. These elements 12,13 are constant-force flat springs that are so constructed as to tend constantly to coil up upon themselves. Coils 12a,13a are thus present at all times in a housing, preferably housing 18. At all times, including during the winding process, the force exerted by the springs is constant.

The springs are formed of metal and therefore are current conductors; they are—very preferably—employed to complete the circuit between the inside and outside units.

At one point in each spring, numbered 38, each spring is bent sharply. Preferably, such bend is an acute angle, preferably about forty-five degrees, when the spring is in the free condition shown in FIG. 4. A purpose of the sharp bend is to create a flexural force tending to maintain one of the units 10,11, preferably unit 11, against a door surface.

Formed integrally with the bottom wall of portion 20 of inside housing 18 are bearing posts 39. Four such posts 39 are provided, two for each of the springs 12,13. Spools 41, preferably formed of synthetic resin, and flanged at one side, are mounted rotatably between the bearing posts for free rotation about an axis, the axis being indicated at 42 in FIG. 3. The mounting of the spools 41 in freely-rotatable relationship on bearing posts 39 may be effected (for example) by short shafts or bolts that extend through the spools, along axis 42, each shaft extending through two bearing posts and the spool 41 between them.

As shown in FIGS. 2 and 3, the bearing posts and the horizontal planes when the inside unit 10 is in mounted condition on the door. Stated otherwise, axis 42 is vertical when the inside unit is thus mounted. Preferably, the posts and spools are located between the electronic circuitry 32 and that sidewall of housing 18 which is nearest the door edge 15 when the inside unit 10 is in mounted condition. Stated otherwise, and preferably, the bearing posts and spools are spaced only a relatively short distance from such housing sidewall nearest door edge 15.

The springs 12,13 are coiled on the two spools 41, to form coils 12a,13a, there being a sufficient number of coils that the springs may be pulled off the spools sufficient distances to effect mounting of the unit on a door 14 of any conventional thickness. The inner ends of the springs (adjacent the spool surfaces) may be connected to the spools but need not be. Since the springs 12,13 have the strong natural tendency to coil up, they tend to cause the spools 41 to rotate counterclockwise as viewed in FIG. 3.

The springs 12,13 extend outwardly from housing 18 through s openings 43 in the side wall of such housing, the openings being on the opposite side of the spools from electronic circuitry 32, and being spaced away from the bottom housing wall. Thus, the bend points 38 are outside the housing 18 and can be spaced various distances from such housing 18 depending upon the number of coils that are on the spools.

The regions of springs 12,13 on the opposite sides of bends 38 from the spools extend into housing 21 of outside unit 11. Such extensions are through openings 44 formed in section 23 of housing 21 adjacent the bottom housing wall. Each opening 43,44 is preferably a vertical slot the walls of which are closely adjacent the associated spring 12,13.

Inside the housing 21, each spring 12,13 is secured to a post 46, it being understood that there are two such posts 46, one above the other, one for each of the springs 12,13. The securing is effected by screws 47 threaded into the post ends. Preferably, though not necessarily, the posts are located relatively near openings 44.

There is caused to be a predetermined spacing between each bend 38 and the adjacent side of housing 21. This spacing is such that when bends 38 are nested over the inside corner of door edge 15, housing 21 will be spaced from such corner a substantial distance that is sufficient to prevent contact with stop element 17.

The electric circuit in the present system is as follows. Two leads 48 connect the two terminals of speaker/microphone 29 of outside unit 11 to the two springs 12,13, the connections being effected at the ends of the respective posts 46 by means of the s crews 47. Current can thus flow between speaker/microphone element 29 and the respective spring coils 12a,13a on spools 41.

Brushes 49 make sliding connections with the exterior surfaces of the coils at regions adjacent electronic circuitry 32. Preferably, these brushes are sharply-bent discrete sections of the constant-force spring. There are two such brush sections, one for each coil of spring element, and they have portions sandwiched between circuit board 33 and the posts 34 which mount such circuit board and the electronics 32. The brushes 49 make electric connection with conductive portions of circuit elements of the circuitry 32. Preferably, the portion of each brush 49 that engages a coil is convex toward the left as viewed in FIG. 3.

Method of Transporting, Mounting on the Door, and Using

For transporting in a suitcase, box, etc., the units 10 and 11 are held in the positions shown in FIG. 1. Such holding results automatically from coiling of the springs 12,13 on spools 41, and also results from the coil-generated torque described below. A flexible plastic container may be provided into which the units 10,11 fit snugly so as to facilitate carrying in a suitcase to a vacation condo, hotel, etc.

To mount the through-door intercom on a door, it is merely necessary to position the outside unit 11 in the position shown (for example) in FIG. 3, with bends 38 nested over the door corner. The outside unit is thus spaced sufficiently far from the door frame or jamb 16 that it will not be in danger of contacting the stop element 17 of conventional door frames, when the door opens or closes.

Not only do the bends 38 determine the spacing, but they cause the constant-force springs to be closely adjacent the edge surface of the door as well as adjacent the outside door surface 25. Because of the bend relationship described above relative to FIG. 4, by which the springs when in their free conditions are bent at acute angles, it follows that placing the outside unit 11 flatwise (parallel) against the door surface 25 is accompanied by substantial flexing of the springs 12,13, so that the (for example) forty five-degree angles become substantially right angles. The resulting spring flexure generates torque tending to hold the outside unit 11 flatwise against door surface 25.

In constructions where the springs 12,13 are not thick and wide enough to generate sufficient flexural spring force to hold outside unit 11 flatwise against door surface 25, double-sided adhesive strips, incorporating pressure-sensitive adhesive that is subsequently removable from the door surface, are adhesively provided on the feet or pads 24 of the outside housing 21, to adhesively secure such outside housing to the door.

After unit 11 is mounted and positioned, and while the door is in open condition, the inside unit 10 is pulled to thereby uncoil sufficient lengths of spring 12,13 to permit the inside unit to be positioned at the location illustrated in FIGS. 2 and 3. Such position is close to the door edge.

The coiled springs 12,13 generate torque that causes the inside housing 18 to pivot counterclockwise about those feet or pads 28 that are nearest the door edge, so that the feet or pads 26 remote from the door edge are caused to be firmly in contact with inside door surface 27.

The described torque results from interaction between the spring coils 12a,13a, and the adjacent spring and housing portions, which interaction is believed to create force vectors that pass generally through the axis 42 and through the bottom bearing posts 39 as viewed in FIG. 3.

The intercom apparatus is thus mounted in a matter of seconds or (in those situations where adhesive may be required relative to the pads 24 of the outside unit 11) in about a minute.

The spring elements 12,13 are not harmed by opening and closing of the door, this being because they are flat, and because they have no insulation thereon that becomes pinched, etc. On the other hand, the elements 12,13 are rugged and long lasting, and will create both technical connection and electrical connection for long periods of time.

It is to be understood that different numbers of springs 12,13 may be employed, as desired for strength and for production convenience. Preferably, however, there are at least two springs so as to provide two leads for the electric circuitry.

When the through-door intercom is employed in a vacation condo, hotel, etc., it may be removed in a matter of seconds after the vacation or hotel stay is over.

The foregoing detailed description is to be clearly understood as given by way of illustration and example only, the spirit and scope of this invention being limited solely by the appended claims.

What is claimed is:

1. A through-door security intercom system, which comprises:
   (a) an outside electrical intercom unit,
   (b) an inside electrical intercom unit, said units being small in size,
   (c) means to mount said outside and inside units near the outside and inside surfaces, respectively, of a door adjacent an edge of said door,
      said mounting means including, at least in part, means that extend between said outside and inside units adjacent said door edge between said edge and the jamb of said door, there being nothing that extends into or through said door, and
   (d) means to electrically connect said outside and inside units to each other.

2. The invention as claimed in claim 1, in which said electrical connector means including at least part of said mounting means.

3. The invention as claimed in claim 1, in which said outside and inside units, said mounting means and said connector means are combined with said door, said units being mounted on said door surface adjacent a vertical door s edge, said mounting means extending, at least in part, between said door edge and the jamb of said door.

4. A through-door security intercom system, which comprises:
   (a) an outside electrical intercom unit,
   (b) an inside electrical intercom unit, said units being small in size,
   (c) resilient means to clamp at least one of said outside and inside units against one of the outside and inside door surfaces adjacent an edge of said door, said resilient means being associated with means that extend between said outside and inside units adjacent said door edge between said edge and the jamb of said door, and, (d) means to electrically connect said outside and inside units to each other.

5. The invention as claimed in claim 4, in which said resilient means generates torque that clamps said outside unit against said outside door surface and said inside unit against said inside door surface.

6. A portable through-door security intercom system adapted to be readily secured to and removed from the doors of dwelling spaces such as apartments, hotel rooms, condominiums, houses, etc., said system comprising:

(a) an outside electrical intercom unit, said outside unit having a housing, (b) an inside electrical intercom unit, said inside unit having a housing, and (c) means to removably secure said housings of said units to the door of a dwelling space, adjacent an edge of said door, said means comprising spring means, disposed in said housing of at least one of said units, to generate torque that clamps said housing of said one unit against a surface of said door.

7. The invention as claimed in claim 6, in which said torque-generating means comprises a coil spring.

8. The invention as claimed in claim 7, in which said coil spring is a constant-force coil spring that tends constantly to wind itself into a coil.

9. The invention as claimed in claim 8, in which said spring is a flat spring.

10. A portable through-door security intercom system adapted to be readily secured to and removed from the doors of dwelling spaces such as apartments, hotel rooms, condominiums, houses, etc., said system comprising:

(a) an outside electrical intercom unit, (b) an inside electrical intercom unit, and (c) means to removably secure said units to the door of a dwelling, adjacent an edge of said door, said means comprising a spring that is sharply bent to an acute angle, one part of said spring, on one side of the bend therein, being connected to the housing of one of said units, another part of said spring, on the other side of said bend therein, being adapted to extend across said edge of said door adjacent the surface of said edge, said other part of said spring then operating through said one part thereof to clamp said one unit against a side surface of said door near said edge thereof when said bend is nested over the corner of said door that is defined by said side surface and said surface of said door edge.

11. A portable through-door intercom system adapted to be mounted on and removed from the doors of various types of dwelling spaces without damaging such doors, said system comprising:

(a) a first electrical intercom unit, (b) a second electrical intercom unit, (c) at least one coil of constant-force spring, mounted in said first unit, said constant-force spring tending constantly to wind itself up in said coil, said constant-force spring extending out of said first unit from said coil, and (d) means to connect the end portion of said spring, remote from said coil, to said second unit, said spring being adapted to extend between said first and second units through the crack between a door edge and a door jamb, said spring connecting said units to each other regardless of the thickness of said door, said spring urging said units against opposite sides of said door near said door edge.

12. The invention as claimed in claim 11, in which said coil of constant-force spring is so disposed in said first unit that it generates a torque that pivots said first unit into substantially parallel contact with a side of said door.

13. The invention as claimed in claim 11, in which spool means are mounted in said first unit in freely-rotatable relationship, in which said coil is mounted concentrically on said spool means, and in which the direction of coiling of said coil on said spool means is such that said spring generates a torque that pivots said first unit into flatwise engagement with a side of said door.

14. The invention as claimed in claim 11, in which electric circuit means extend between said first and second electrical intercom units, and in which said spring forms part of said electric circuit means, said spring conducting current through said crack between said door edge and door jamb.

15. The invention as claimed in claim 14, in which a brush is mounted in said first unit in engagement with said coil, to conduct current from said coil to circuitry forming part of said first electrical intercom unit.

16. The invention as claimed in claim 11, in which a sharp bend is formed in said spring at a location remote from said coil and also spaced away from said second unit, said sharp bend being adapted to nest over a corner of said door.

17. The invention as claimed in claim 16, in which said sharp bend in an acute angle when said spring is in free condition, and in which said sharp bend is caused to change from and acute angle to a substantially right angle when the intercom system is mounted on said door, the change between acute angle and right angle causing flexing of said spring and thus creating a force urging said second intercom unit against a surface of said door in substantially parallel engagement therewith.

18. The invention as claimed in claim 11, in which at least two coils of constant-force spring are mounted in said first unit, both of said coils tending to wind themselves up in said coils, both of said constant-force springs extending out of said first unit from said coils, and in which both of said springs are connected at their end portions to said second unit.

19. The invention as claimed in claim 18, in which both of said springs form parts of the electric circuit between said first and second electrical intercom units, said springs being the sole conductors between said units, and conducting electricity through said crack between said door edge and door jamb.

20. The invention as claimed in claim 11, in which said end portion of said spring, remote from said coil, is connected to said second unit interiorly thereof.

21. The invention as claimed in claim 20, in which said spring extends out of said first unit and into said second unit through slots the walls of which are adjacent said spring.

* * * * *